(12) United States Patent
Sugirtharaj et al.

(10) Patent No.: US 6,834,044 B2
(45) Date of Patent: Dec. 21, 2004

(54) MULTI-PATH DATA STREAMING IN A WIRELESS PACKET DATA NETWORK

(75) Inventors: David Sugirtharaj, St. Helen's Blackrock (IE); Paul Lee, Kirkland, WA (US); Suhail Hasan, Redmond, WA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 821 days.

(21) Appl. No.: 09/784,585

(22) Filed: Feb. 15, 2001

(65) Prior Publication Data

US 2002/0110097 A1 Aug. 15, 2002

(51) Int. Cl.⁷ .............................................. H04Q 7/00
(52) U.S. Cl. ...................... 370/328; 370/331; 370/401
(58) Field of Search ................................ 370/328, 331, 370/338, 401, 428

(56) References Cited

U.S. PATENT DOCUMENTS

| | | | |
|---|---|---|---|
| 5,612,948 A | | 3/1997 | Fette et al. .................. 379/252 |
| 5,940,762 A | * | 8/1999 | Lee et al. .................... 455/442 |
| 6,507,572 B1 | * | 1/2003 | Kumar et al. ................ 370/335 |
| 6,567,387 B1 | * | 5/2003 | Dulin et al. ................. 370/329 |
| 6,608,832 B2 | * | 8/2003 | Forslow ....................... 370/353 |

FOREIGN PATENT DOCUMENTS

| | | |
|---|---|---|
| WO | WO 99/14975 | 3/1999 |
| WO | WO 99/52307 | 10/1999 |
| WO | WO 00/38468 | 6/2000 |

OTHER PUBLICATIONS

PCT Search Report dated Feb. 26, 2003 from application No. PCT/CA02/00155.

* cited by examiner

*Primary Examiner*—Kenneth Vanderpuye
*Assistant Examiner*—Christine Ng
(74) *Attorney, Agent, or Firm*—Smith, Danamraj & Youst, P.C.

(57) ABSTRACT

A system and method in a packet-switched radio access network of sending data packets over a radio interface from a Mobile Station (MS) to a Radio Network Controller (RNC) using multiple data transmission paths. When the MS launches a new application through a first base station (BS1), a Multi-path Context Activator (MCA) in the RNC determines whether the bandwidth required by the new application exceeds the bandwidth capacity of the radio interface portion of the first data transmission path. If so, the RNC identifies a second BS (BS2) that has the capacity to provide a portion of the radio interface bandwidth required. The MS then transmits separate data streams to BS1 and BS2 as over the radio interface. The MCA combines the separate upstream data portions. For downstream packets, the MCA separates the packets into two streams which are sent to an MCA in the MS via BS1 and BS2.

12 Claims, 4 Drawing Sheets

MULTI-PATH DATA STREAMING IN A WIRELESS PACKET DATA NETWORK

BACKGROUND OF THE INVENTION

1. Technical Field of the Invention

This invention relates to telecommunication systems and, more particularly, to a system and method of sending data packets over a radio interface using multiple data transmission paths.

2. Description of Related Art

It has been demonstrated that most Internet Protocol (IP)-based applications in Terminal Entities (TEs) that are running real-time applications such as Voice-over-IP (VoIP), Streaming Video, or even best effort applications involving large graphical file downloads are severely challenging the limited resources offered by 2G and 3G wireless packet networks. Moreover, most of the bandwidth and delay limitations occur in the radio interface portion of the transmission path. Because of the bandwidth and delay limitations of the packet radio interface, TEs today are unable to open up more than one bandwidth-intensive application at a time.

Presently, Universal Mobile Telecommunications System/Wideband Code Division Multiple Access (UMTS/Wideband CDMA) standards allow up to four different Quality of Service (QoS)-based Packet Data Protocol (PDP) Contexts to be opened for any single PDP address (IP address). The four QoS classes represent application requirements such as Real Time, Best Effort, and so on. These are used to set up radio interface and core network scheduling along with traffic shaping. However, even with QoS-based scheduling and differential handling of different application requests, only a single data path exists for all packets traversing the network. Additionally, it has been shown that VoIP protocols add sizable overheads in addition to the actual speech frame, and therefore their transmission becomes very inefficient over packet radio interfaces.

Most VoIP schemes today rely on heavy compression algorithms that operate by changing the header state, and are therefore not designed for the lossy environment prevalent on the radio interface. Once packet loss is factored in, medium quality VoIP over the packet radio interface becomes extremely difficult, if not impossible, to achieve.

Therefore, it would be advantageous to have a system and method of sending data packets over a packet radio interface that relieves the bandwidth and delay limitations currently experienced, and enables TEs to run more than one bandwidth-intensive application at a time. The present invention provides such a system and method.

SUMMARY OF THE INVENTION

In one aspect, the present invention is a method in a packet-switched radio access network of sending data packets over a radio interface from a Mobile Station (MS) to a Radio Network Controller (RNC) using multiple data transmission paths. The method includes the steps of providing the MS with a first data transmission path through a first base station (BS1) and, when the MS launches a new real-time application, sending a new registration message from the MS to a server such as a Serving GPRS Service Node (SGSN) that performs radio access bearer control. It is then determined within the network, whether the bandwidth required by the new application exceeds the bandwidth capacity of the radio interface portion of the first data transmission path. If so, the method identifies a second BS (BS2) that has the capacity to provide a portion of the radio interface bandwidth required. This is followed by providing the MS with a second data transmission path through BS2; inserting by the MS, an identifier label on each upstream data packet; and transmitting a portion of the labeled upstream data packets to BS1 and a portion to BS2 as separate data streams over the radio interface. The separate upstream data portions are then sent from BS1 and BS2 to the RNC where they are combined using the identifier labels.

The method may also include the steps of sending downstream data packets for the MS from the SGSN to the RNC; inserting by the RNC, an identifier label on each downstream data packet; and transmitting a portion of the labeled downstream data packets to BS1 and a portion to BS2 as separate data streams over the radio interface. The separate downstream data portions are then sent from BS1 and BS2 to the MS where they are combined using the identifier labels.

In another aspect, the present invention is a system in a packet-switched radio access network for sending data packets over a radio interface from an MS to a plurality of BSs and an RNC using multiple data transmission paths. The MS has a first radio interface data transmission path established to a first base station (BS1). The system includes a bearer-control server for providing radio access bearer control in a service area, and for notifying the RNC when the MS launches a new real-time application. The system also includes means within the MS for inserting an identifier label on each upstream data packet and dividing an upstream data stream into a plurality of upstream portions, each upstream portion being transmitted by the MS to a different BS based on a BS-identifier and a code. An RNC is connected to the bearer-control server, and controls the plurality of BSs. The RNC includes a bandwidth analyzer for determining whether the bandwidth required by the new application exceeds the bandwidth capacity of the first radio interface data transmission path; and means for identifying a second BS (BS2) that has the capacity to provide a portion of the radio interface bandwidth required. A first signaling mechanism receives a plurality of upstream data portions from the plurality of BSs. The RNC also includes a combiner that combines the plurality of upstream data portions into a combined upstream data stream based on the identifier labels; and a second signaling mechanism for sending the combined upstream data stream to the bearer-control server.

In yet another aspect, the present invention is an RNC in a radio access network that enables an MS that is running a first application over a first radio interface data transmission path through a first base station (BS1) to launch a second application at the same time. The RNC includes a bandwidth analyzer for determining whether the bandwidth required by the second application exceeds the bandwidth capacity of the first radio interface data transmission path; and means for identifying a second base station (BS2) that has the capacity to provide a portion of the radio interface bandwidth required. The RNC also includes means for instructing the MS to insert identifier labels in each upstream data packet, to divide its upstream data stream into two upstream data portions, and to transmit a first portion from the MS to BS1 and a second portion from the MS to BS2. The RNC also includes a first signaling mechanism for receiving the first portion from BS1 and the second portion from BS2; a combiner that combines the first and second upstream data portions into a combined upstream data stream based on the identifier labels; and a second signaling mechanism for sending the combined upstream data stream to a bearer-control server.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention enables the transmission of real-time applications over wireless data networks. It enables a greater amount of data to be sent over the limited radio interface, and enables the user to open up multiple bandwidth-intensive applications, thus enabling terminals to function closer to the wireline paradigm on which most Internet Engineering Task Force (IETF) standards rest.

The invention utilizes a multiple unicast data streaming technique to solve the radio interface problem by using different paths for different portions of the packets, thus multiplying the bandwidth and enabling the running of these real-time programs on the MS. The present invention utilizes multiple physical radio and core network interface paths to enable optimized transfer of packet data between MSs and an IP-based network.

Figure 1:
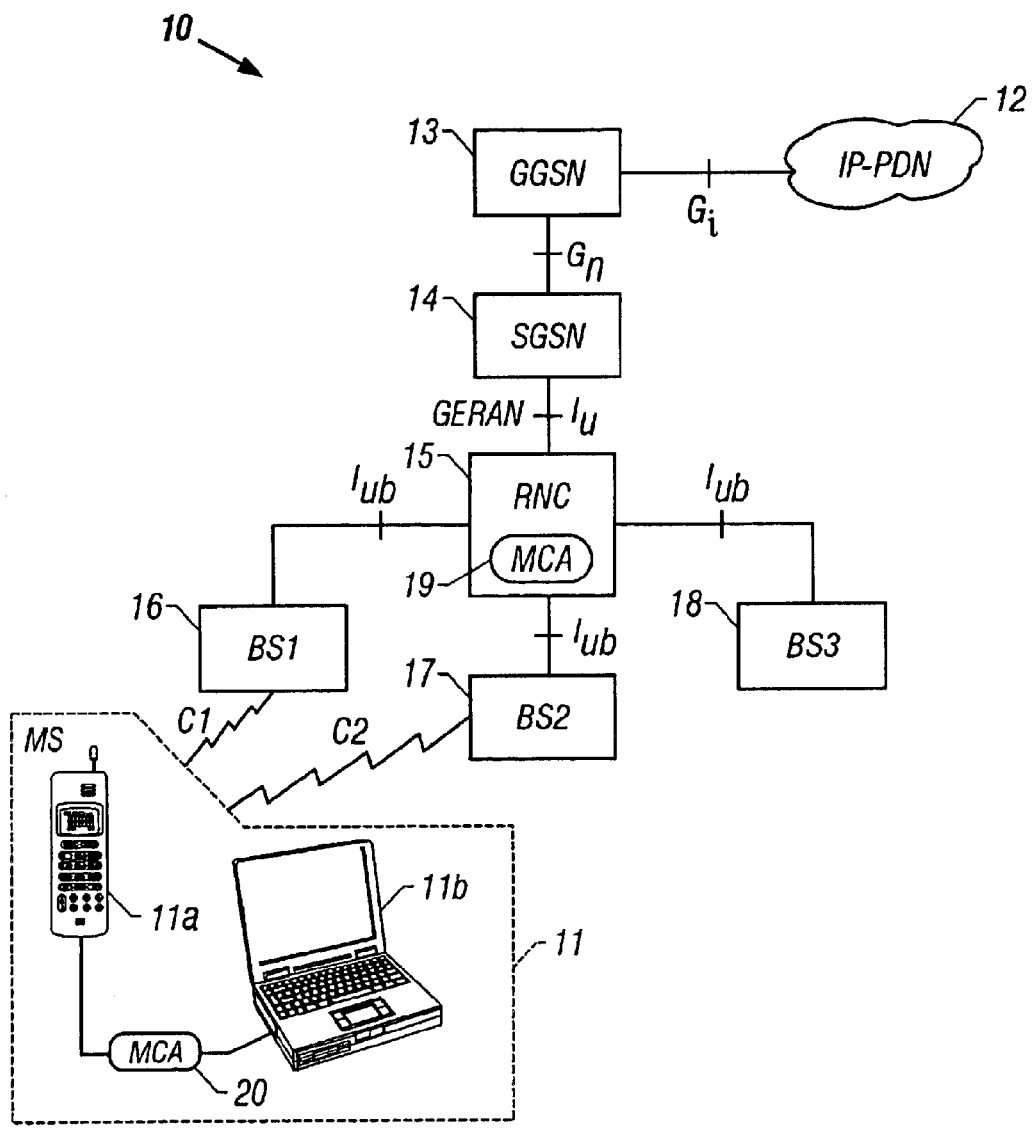
FIG. 1 is a simplified block diagram of the preferred embodiment of the system of the present invention.

FIG. 1 is a simplified block diagram of the preferred embodiment of the system of the present invention. FIG. 1 illustrates a wireless packet-switched network 10 that is based on the UMTS/CDMA family of wireless packet-switched networks. The wireless packet-switched network 10 connects a mobile station (MS) 11 to an IP-based packet data network (IP-PDN) 12. The MS is generally recognized as including a wireless access device such as a mobile phone 11a and a Terminal Equipment (TE) 11b for running applications. The packet-switched network includes a Gateway GPRS Service Node (GGSN) 13 that utilizes a Gi interface to access the IP-PDN. A bearer-control server such as a Serving GPRS Service Node (SGSN) 14 interfaces with the GGSN over a Gn interface, and may provide radio access bearer control in a particular service area. A Radio Network Controller (RNC) 15 controls the radio resources in a particular region of the service area of the SGSN, and interfaces with the SGSN over an Iu interface or a GPRS Enhanced Radio Access Network (GERAN) interface. The RNC controls base stations BS1, BS2, and BS3 16–18, respectively. For simplicity, FIG. 1 only shows a single GGSN, SGSN, and RNC although it should be recognized that a greater number may be present in actual networks.

Initially, the MS 11 may be provided with a single PDP Context, a single SGSN, and a single Radio Access Network (RAN) connection through BS1 16, utilizing one code (C1). In the case of GPRS, one logical packet data channel is provided. When the MS 11 launches a new application such as an H.323 application or a Real Player streaming video session, a new secondary PDP Context Activation message identifying the QoS involved is sent from the MS to the SGSN 14. This message enables QoS-based network paths to be set up within the core network to minimize delay and maximize throughput.

The SGSN 14 notifies the RNC 15 of the secondary PDP Context message as is done today. When a multimedia call has to be delivered to the MS 11, the SGSN 14 must seize the radio access bearers it needs to carry the call. One radio access bearer is seized for each application stream that is to be delivered to the MS. As part of the invention, a new functional entity called a Multi-path Context Activator (MCA) 19 is introduced. The MCA functionality resides principally with the RNC and the MS 11. In the preferred embodiment, the MCA is located in the RNC since the SGSN in the core network may not know what type of radio access network is being utilized. An additional MCA 20 resides in the MS 11, and acts as a combiner/separator on that end of the data stream. The main purpose of the MCA is to analyze the new bandwidth demand required by the application that was launched in the MS. In the preferred embodiment, the MCA is utilized at all times to optimize call delivery, and is not merely activated when there are capacity problems. The MCA is able to set up multiple data streams based on signal quality, for instance.

If the MCA determines that the bandwidth required is more than what the packet radio interface can provide, a search is conducted for a neighboring BS, such as BS2 17, within the same RNC 15 with coverage of the MS. Selection of the BS may be based on signal strength and/or available bandwidth for packet data applications. The MS is informed about the new BS2, and a new code, C2, is issued for communication with BS2. Alternatively, a 1× vs. 3×RTT approach can be used where the neighboring BS uses the same code, C1, but utilizes different ranges of the 5-MHz frequency band.

The SGSN Mobility Management (MM) function state shows the MS as belonging to the assigned RNC 15. The RNC subdivides the MM context into a primary part belonging to BS1 and a secondary part belonging to BS2. The MS can then transmit different IP application data streams based on the QoS over the different codes/base stations. Alternatively, the MS can collect entire IP datagrams from the application and break the stream in some other manner. Each portion of the data stream is modulated by a separate code and then sent upstream. An identifier label is inserted on each packet. Upstream packets from the MS take different paths to the MCA 19, where they are combined based on the identifier label, and are sent to the SGSN 14. For downstream packets, the MCA adds the identifier label to the packets and divides the data stream into multiple portions which are sent to their respective base stations for downstream delivery to the MS.

Figure 2A:
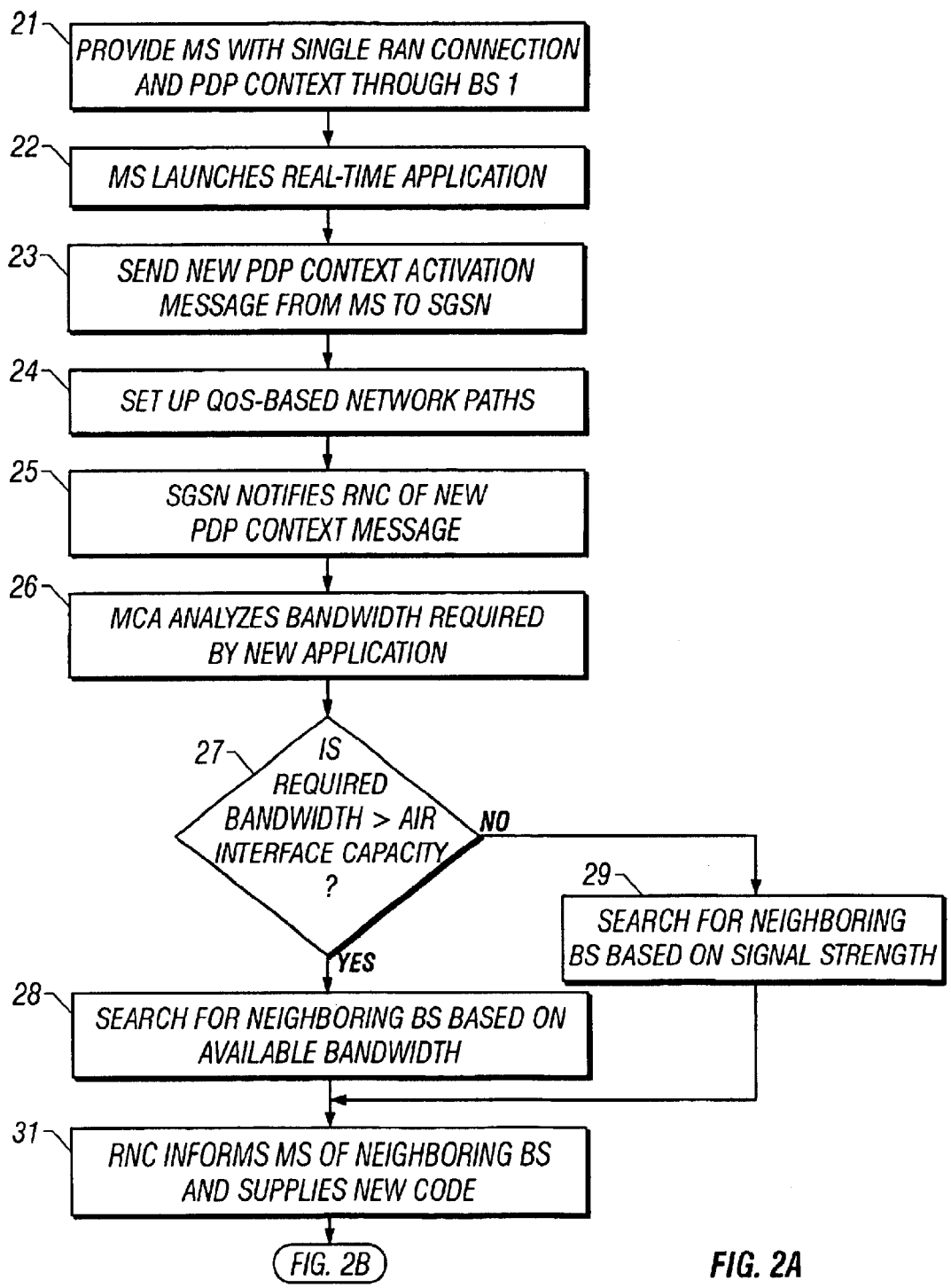
FIGS. 2A and 2B are a flow chart illustrating the steps of the preferred embodiment of the method of the present invention.
Figure 2B:
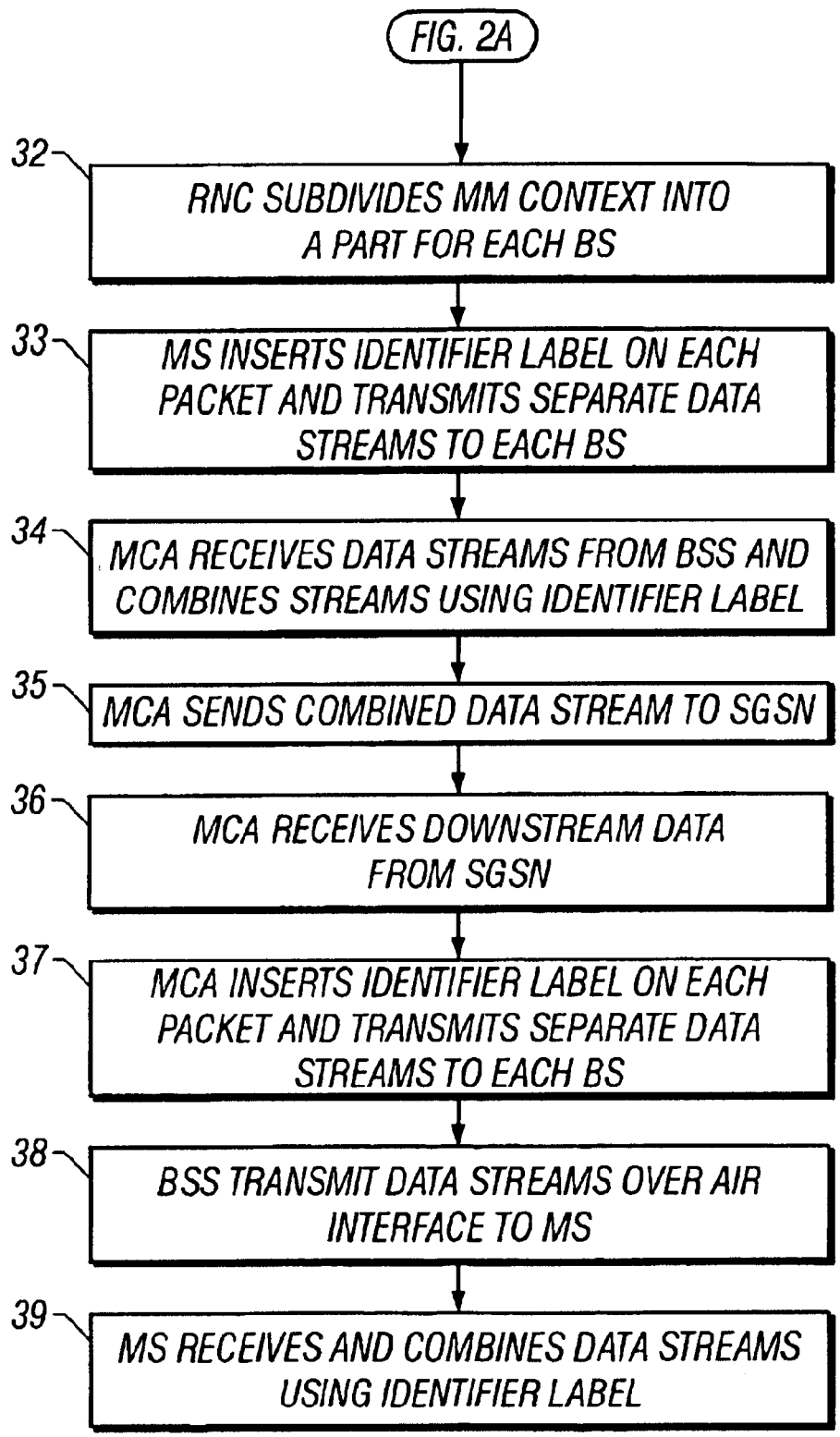

FIGS. 2A and 2B are a flow chart illustrating the steps of the preferred embodiment of the method of the present invention. Referring first to FIGS. 1 and 2A, the MS 11 is provided at step 21 with a single PDP Context, a single SGSN, and a single radio interface connection through BS1 16, utilizing code C1. At step 22, the MS 11 launches a new real-time application. At step 23, a secondary PDP Context Activation message identifying the QoS involved is sent from the MS to the SGSN 14, and at 24, QoS-based network paths are set up within the core network to minimize delay and maximize throughput.

At step 25, the SGSN 14 notifies the RNC 15 of the secondary PDP Context message. At 26, the MCA 19 analyzes the new bandwidth demand required by the application that was launched in the MS 11. At step 27, the MCA determines whether the required bandwidth is more than what the packet radio interface can provide. If so, a search is conducted for a neighboring BS within the same RNC that can provide the required bandwidth. If the MCA determines that the packet radio interface can provide the required bandwidth at 27, the process moves to step 29 where a search is conducted for a neighboring BS within the same RNC that can provide better signal quality. In either case, the RNC then informs the MS about the new BS, and a new code, C2, is issued for communication with the new BS. The process then moves to FIG. 2B.

At step 32, the RNC subdivides the MM context into a primary part belonging to the first BS and a secondary part belonging to the new BS. At step 33, the MS inserts an identifier label on each packet and transmits different IP application data streams to each BS based on the QoS and the different codes. Upstream packets from the MS take different paths to the MCA 19, where they are received at step 34 and combined based on the identifier label. At step 35, the MCA sends the combined data stream to the SGSN 14.

At step 36 the MCA receives downstream data packets from the SGSN destined for the MS. At 37, the MCA inserts the identifier label on the packets and divides the data stream into multiple portions which are sent to their respective base stations based on the QoS and codes. At 38, the BSs transmit the data streams over the radio interface to the MS. At 39, the MS receives and combines the data streams using the identifier labels and the MCA 20 in the MS.

Figure 3:
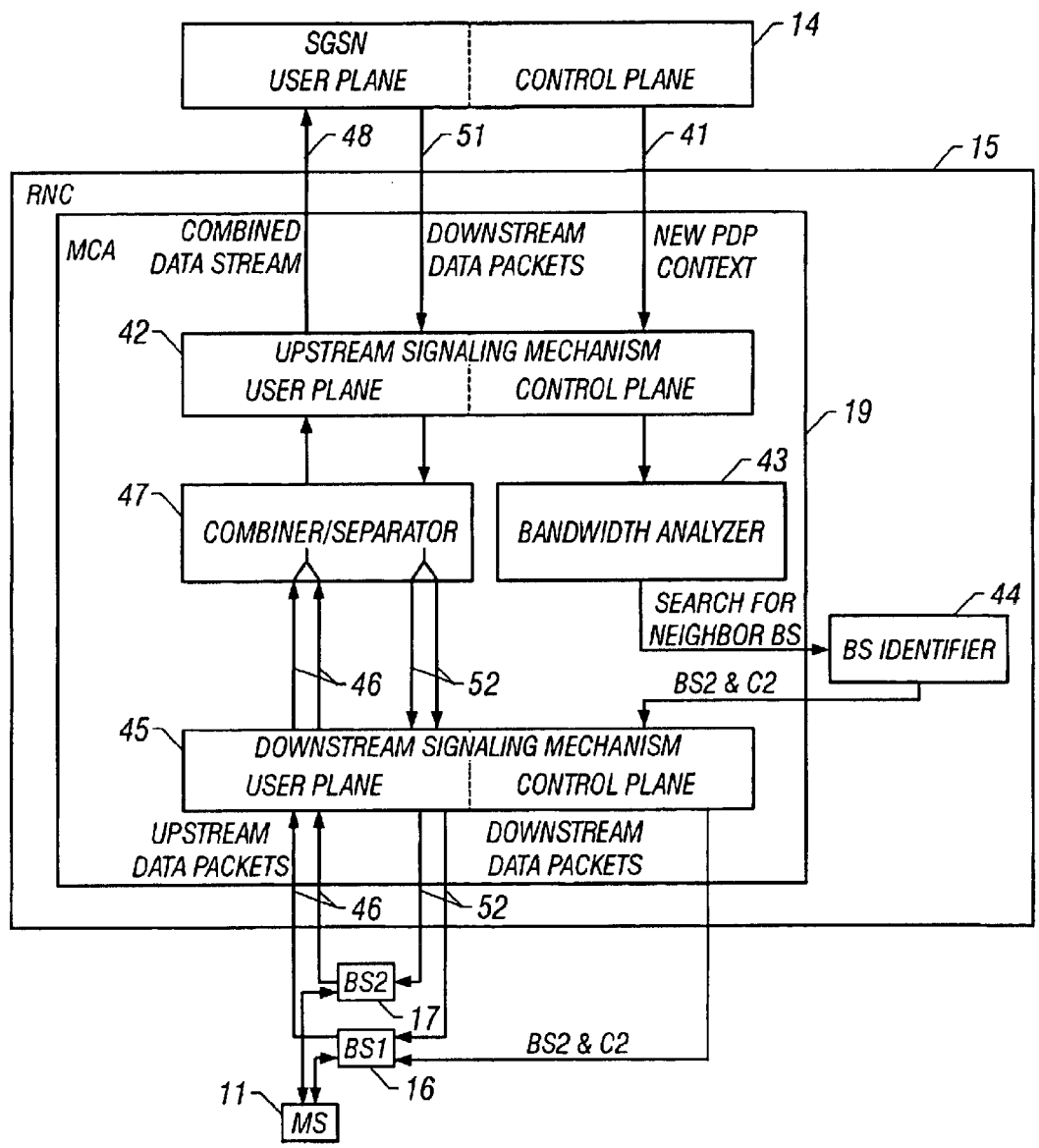
FIG. 3 is a simplified block diagram showing more detail of the Multi-path Context Activator (MCA) when implemented within a Radio Network Controller (RNC).

FIG. 3 is a simplified block diagram showing more detail of the MCA 19 when implemented within the RNC 15. When the MS 11 launches a new real-time application, the SGSN 14 notifies the RNC 15 of the secondary PDP Context message. The notification 41 is received in an upstream signaling mechanism 42 and is passed to a bandwidth analyzer 43. The bandwidth analyzer analyzes the new bandwidth demand required by the application that was launched in the MS, and determines that a neighboring BS should be identified for either bandwidth or signal strength considerations. A BS identifier 44 then identifies the new BS and provides the identity of the BS and a new code (for example, BS2 and C2) to a downstream signaling mechanism 45. The downstream signaling mechanism then passes the new BS and new code to the MS.

After the RNC subdivides the MM context into a primary part belonging to BS1 16 and a secondary part belonging to BS2 17, the MS inserts the identifier label on each packet and transmits different IP application data streams to each BS based on the QoS and the different codes. Upstream data packets 46 take different paths from the MS 11 to the MCA 19, where the downstream signaling mechanism 45 passes them to a combiner/separator 47. The combiner/separator combines the two data streams based on the identifier label and sends the combined data stream 48 to the SGSN 14.

When the SGSN 14 sends downstream data packets 51 to the MCA 19, the combiner/separator 47 inserts the identifier label on the packets and separates the data stream into multiple streams 52 which are sent to BS1 16 and BS2 17 based on the QoS and respective codes for each BS. The BSs then transmit the data streams over the radio interface to the MS where the multiple data streams are combined using the identifier labels.

It is thus believed that the operation and construction of the present invention will be apparent from the foregoing description. While the system, RNC, and method shown and described has been characterized as being preferred, it will be readily apparent that various changes and modifications could be made therein without departing from the scope of the invention as defined in the following claims.

What is claimed is:

1. A method in a packet-switched radio access network of sending data packets over a radio interface from a Mobile Station (MS) to a Radio Network Controller (RNC) using multiple data transmission paths, said method comprising the steps of:
   providing the MS with a first data transmission path through a first base station (BS1);
   sending a new registration message from the MS to a bearer-control server when the MS launches a new real-time application;
   determining within the network, whether a bandwidth required by the new application exceeds a bandwidth capacity of the radio interface portion of the first data transmission path;
   identifying a second BS (BS2) that has capacity to provide a portion of the radio interface bandwidth required, upon determining that the bandwidth required by the new application exceeds the bandwidth capacity of the radio interface;
   providing the MS with a second data transmission path through BS2;
   inserting by the MS, an identifier label on each upstream data packet;
   transmitting a portion of the labeled upstream data packets to BS1 and a portion to BS2 as separate data streams over the radio interface;
   sending the separate upstream data portions from BS1 and BS2 to the RNC; and
   combining the separate upstream data portions using the identifier labels.

2. The method of sending data packets over a radio interface of claim 1 further comprising the steps of:
   sending downstream data packets for the MS from the bearer-control server to the RNC;
   inserting by the RNC, an identifier label on each downstream data packet;
   transmitting a portion of the labeled downstream data packets to BS1 and a portion to BS2 as separate data streams over the radio interface;
   sending the separate downstream data portions from BS1 and BS2 to the MS; and
   combining the separate downstream data portions by the MS using the identifier labels.

3. The method of sending data packets over a radio interface of claim 2 further comprising, after the step of determining whether the bandwidth required by the new application exceeds the bandwidth capacity of the radio interface, the step of identifying a second BS (BS2) that has better signal strength than BS1, upon determining that the bandwidth required by the new application does not exceed the bandwidth capacity of the radio interface.

4. The method of sending data packets over a radio interface of claim 1 wherein the step of determining whether the bandwidth required by the new application exceeds the bandwidth capacity of the radio interface, and the step of combining the separate upstream data streams using the identifier labels are performed in a Multi-path Context Activator (MCA) in the RNC.

5. The method of sending data packets over a radio interface of claim 1 wherein the step of determining whether the bandwidth required by the new application exceeds the bandwidth capacity of the radio interface, and the step of combining the separate upstream data streams using the identifier labels are performed in a Multi-path Context Activator (MCA) that is functionally divided between the RNC and the bearer-control server.

6. The method of sending data packets over a radio interface of claim 1 further comprising, after the step of identifying a second BS (BS2) that has capacity to provide a portion of the radio interface bandwidth required, the step of subdividing the MS's Mobility Management (MM) context into a first part for BS1 and a second part for BS2.

7. A system in a packet-switched radio access network for sending data packets over a radio interface from a Mobile Station (MS) to a plurality of Base Stations (BSs) and a Radio Network Controller (RNC) using multiple data transmission paths, said MS having a first radio interface data transmission path established to a first BS (BS1), said system comprising:

- a bearer-control server for providing wireless telephony services in a service area, said bearer-control server notifying the RNC when the MS launches a new real-time application;
- means within the MS for inserting an identifier label on each upstream data packet and dividing an upstream data stream into a plurality of upstream portions, each upstream portion being transmitted by the MS to a different BS based on a BS-identifier and a code; and
- an RNC connected to the bearer-control server, said RNC controlling the plurality of BSs, said RNC comprising:
  - a bandwidth analyzer for determining whether a bandwidth required by the new application exceeds a bandwidth capacity of the first radio interface data transmission path;
  - means for identifying a second BS (BS2) that has capacity to provide a portion of the radio interface bandwidth required, upon determining that the bandwidth required by the new application exceeds the bandwidth capacity of the radio interface;
  - a first signaling mechanism for receiving a plurality of upstream data portions from the plurality of BSs;
  - a combiner that combines the plurality of upstream data portions into a combined upstream data stream based on the identifier labels; and
  - a second signaling mechanism for sending the combined upstream data stream to the bearer-control server.

8. The system for sending data packets over a radio interface of claim 7 wherein the combiner also includes a separator that inserts an identifier label on each downstream data packet and separates a combined downstream data stream received from the bearer-control server into a plurality of downstream data portions.

9. The system for sending data packets over a radio interface of claim 8 wherein the first signaling mechanism also includes means for sending the plurality of downstream data portions from the RNC to the plurality of BSs based on each BS's identifier and code.

10. The system for sending data packets over a radio interface of claim 9 wherein the MS also includes means for combining the plurality of downstream data portions into a combined downstream data stream based on the identifier labels.

11. A Radio Network Controller (RNC) in a radio access network that enables a Mobile Station (MS) that is running a first application over a first radio interface data transmission path through a first base station (BS1) to launch a second application at the same time, said RNC comprising:

- a bandwidth analyzer for determining whether the bandwidth required by the second application exceeds a bandwidth capacity of the first radio interface data transmission path;
- means for identifying a second base station (BS2) that has capacity to provide a portion of the radio interface bandwidth required, upon determining that the bandwidth required by (the second application) exceeds the bandwidth capacity of the first radio interface data transmission path;
- means for instructing the MS to insert identifier labels in each upstream data packet, to divide its upstream data stream into two upstream data portions, and to transmit a first portion to BS1 and a second portion to BS2;
- a first signaling mechanism for receiving the first portion from BS1 and the second portion from BS2;
- a combiner that combines the first and second upstream data portions into a combined upstream data stream based on the identifier labels; and
- a second signaling mechanism for sending the combined upstream data stream to a bearer-control server.

12. The RNC of claim 11 wherein the first signaling mechanism includes means for sending a BS-identity and code for BS2 to the MS, thereby prompting the MS to insert identifier labels in each upstream data packet, to divide its upstream data stream into two upstream data portions, and to transmit a first portion to BS1 and a second portion to BS2.

* * * * *